United States Patent
Khazaka et al.

(10) Patent No.: US 6,542,732 B1
(45) Date of Patent: Apr. 1, 2003

(54) SYSTEM AND METHOD FOR USE OF DUAL-TONE MULTI FREQUENCY SIGNALS IN A WIRELESS COMMUNICATION SYSTEM

(75) Inventors: Samir K. Khazaka, San Diego, CA (US); Mazen Chmaytelli, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/287,995

(22) Filed: Apr. 7, 1999

(51) Int. Cl.⁷ .............................................. H04M 11/10
(52) U.S. Cl. ...................... 455/412; 455/466; 455/550; 455/564
(58) Field of Search ................................. 455/564, 412, 455/413, 414, 415, 458, 459, 466, 460, 461, 565, 550, 551, 556, 557, 566, 558; 379/283, 142.04, 142.18, 209.01, 355.01, 355.02, 355.03; 711/170, 173, 147; 707/100, 200, 205, 504

(56) References Cited

U.S. PATENT DOCUMENTS

| | | | | |
|---|---|---|---|---|
| 5,128,980 A | * | 7/1992 | Choi | 455/412 |
| 5,459,773 A | * | 10/1995 | Hwang | 455/412 |
| 5,606,597 A | * | 2/1997 | Newland | 379/355.07 |
| 5,768,362 A | * | 6/1998 | Moon | 379/355.05 |
| 6,125,287 A | * | 9/2000 | Cushman et al. | 455/566 |
| 6,138,038 A | * | 10/2000 | Huotari | 455/564 |
| 6,163,693 A | * | 12/2000 | Rydbeck | 455/414 |

* cited by examiner

*Primary Examiner*—Lester G. Kincaid
(74) *Attorney, Agent, or Firm*—Philip Wadsworth; Charles D. Brown; Kevin Cheatham

(57) ABSTRACT

A data storage area allows a user of a wireless communication device to enter data to be processed and transmitted as a series of dual-tone multi-frequency (DTMF) tones. A wireless communication device transmits call origination over the traffic channel and can transmit DTMF tones over the traffic channel. The user may enter data into a storage area along with an indication that the entered data should be processed as DTMF tones. Data entered as DTMF tones is processed and transmitted over the traffic channel as a series of DTMF tones. A data storage area may have predetermined locations wherein data stored in the predetermined locations are processed as DTMF tones. Alternatively, a data flag or other indicator may be associated with the data to indicate processing as DTMF tones.

4 Claims, 4 Drawing Sheets

SYSTEM AND METHOD FOR USE OF DUAL-TONE MULTI FREQUENCY SIGNALS IN A WIRELESS COMMUNICATION SYSTEM

FIELD OF THE INVENTION

The present invention is directed generally to a wireless communication system and, more particularly, to a system and method for the use of dual-tone multi-frequency signals in a wireless communication system.

BACKGROUND OF THE INVENTION

Wireless communication devices, such as cellular telephones, are widely used as a replacement for conventional telephone systems. In addition to functioning as a replacement for a conventional telephone, wireless communication devices offer the advantage of portability, thus enabling the user to establish a wireless communication link between virtually any two locations on Earth.

In addition to conventional voice communication, wireless communication devices also provide features such as voicemail, voice messaging, and automatic callback notification. Callback notification allows a caller to automatically transmit his telephone number to simplify the process of returning a call. For example, the user of a wireless telephone may place a call that is not received by the intended recipient. A message may be left for the intended recipient and include a "callback number," which corresponds to the caller's mobile identification number. The message recipient may readily establish a communication link with the wireless communication device using the callback number.

Other features, such as three-way calling, are also readily implemented using the conventional communication device. The user of the wireless communication device establishes a first communication link by selecting a stored telephone number from a telephone book storage area within the wireless communication device. When the first communication link is established, the user establishes the second communication link by manually entering a second destination telephone number or by selecting a second destination telephone number from the telephone book storage area.

As is well known in the art, DTMF tones are used to indicate the selection of keys on a telephone keypad. While the user of the conventional wireless communication device can manually enter digits on the keypad and transmit data as DTMF tones, there is no convenient way to automatically send stored data as a series of DTMF tones. Therefore, it can be appreciated that a system and method for processing stored data as DTMF tones would offer a useful advantage. The present invention provides this and other advantages as will be apparent from the following detailed description and accompanying figures.

SUMMARY OF THE INVENTION

The present invention is directed to a system and method for processing data stored in a wireless communication device as a series of dual-tone multi-frequency (DTMF) tones. The wireless communication device comprises a storage area to store data. An indicator is available to indicate that the stored data should be processed as DTMF data. An input device operable by the user can select a portion of the stored data for processing.

In one embodiment, the storage area comprises a plurality of predetermined data locations reserved for storing data that will be processed as DTMF data. The data location itself serves as the indicator that the data stored in the plurality of predetermined data locations should be processed as DTMF data.

The device may further include an identification number stored in the storage area with the indicator indicating that the identification number should be processed as DTMF data. For example, the device may have a mobile identification number which is stored in the storage area and processed as DTMF data. In addition, the stored data may include account data or access code data that is processed as DTMF data.

Alternatively, the device may include a data portion associated with the stored data that serves as the indicator that the data in the storage area should be processed as DTMF data. In an exemplary embodiment, the input device is operated by the user in a predetermined manner to control the data portion and thereby indicate that the associated data should be processed as DTMF data.

DETAILED DESCRIPTION OF THE PREFERRED EMBODIMENTS

The present invention is directed to a technique for processing stored data as dual-tone multi-frequency (DTMF) tones in a wireless communication device. Although described herein as a cellular telephone, those skilled in the art can appreciate that the present invention is applicable to other forms of communication, such as personal communication systems (PCS), mobile radio telephones, mobile radio, and the like.

As those skilled in the art can appreciate, the conventional cellular telephone or PCS device operates on multiple channels. The user may manually enter a destination telephone number or extract a prestored destination telephone number. The destination telephone number is transmitted over the traffic channel along with other identification data such as a mobile identification number (MIN) and an electronic serial number (ESN).

The wireless communication device utilizes messages over the traffic channel for the actual transmission of voice and/or other data, such as DTMF tones. The transmission of DTMF tones is useful for entering data, such as credit card numbers, calling card numbers, access codes, and the like. Using conventional telephone technology, the user may manually enter digits once a wireless communication link has been established. The manually entered digits will be transmitted as a series of DTMF tones. However, the conventional communication device does not permit prestored numbers, such as listed above, to be processed as a series of DTMF tones. If the user extracts a prestored number, the wireless communication device in the conventional communication system processes the data for transmission as a new call originating on the traffic channel rather than a DTMF sequence.

The present invention permits the processing of prestored data as a series or plurality of DTMF tones that are transmitted over the traffic channel. This greatly simplifies communication by allowing the user to prestore selected numbers and recall them with a minimum number of keystrokes. Such efficiency in data processing simplifies the operation of the wireless communication device by eliminating the tedium of the repeated manual entry of data, eliminates the need to remember various numbers for manual entry, and promotes safety in operation of the wireless communication device in an automobile by minimizing the number of keystrokes that are required to enter certain data.

Figure 1:
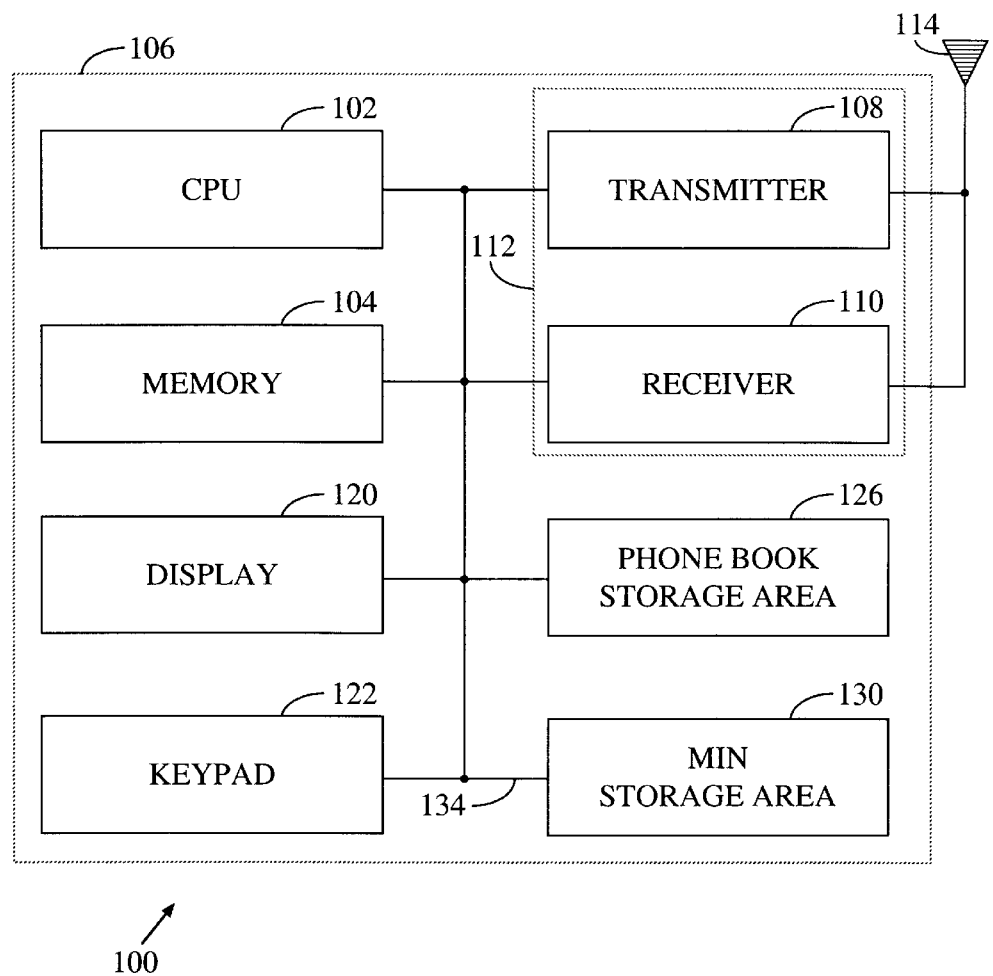
FIG. 1 is a functional block diagram of an exemplary embodiment of the wireless communication device of the present invention.

The present invention is embodied in a system 100 illustrated in the functional block diagram of FIG. 1. The system 100 includes a central processing unit (CPU) 102, which controls operation of the system. A memory 104, which may include both read-only memory (ROM) and random access memory (RAM), provides instructions and data to the CPU 102. A portion of the memory 104 may also include non-volatile random access memory (NVRAM).

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller (not shown). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein.

The system 100 also includes a display 120 to conveniently display instructions to the user as well as user-entered data and stored data. In an exemplary embodiment, the display 120 can conveniently store data and allow the user to select stored data for transmission by the transmitter 108.

A keypad 122 is attached at the housing 106 for operation by the user in a conventional manner. As will be described below, the keypad 122 provides a convenient input device by which data may be entered for storage in a conventional manner or identified for future processing as a series of DTMF tones.

The system 100 also includes a phonebook storage area 126 to store a plurality of destination telephone numbers and associated names. In an exemplary embodiment, the phonebook storage area 126 is capable of storing up to 99 telephone numbers. Each entry in the phonebook storage area 126 is manually programmed by the user via the keypad 122. The phonebook storage area 126 may be included in the NVRAM portion of the memory 104 or may be a separate storage area.

As will be described in greater detail below, a portion of phonebook storage area 126 may be designated for storing data that will be processed as DTMF tones. As those skilled in the art can appreciate, the data itself is stored as a series of zeroes and ones. However, the system 100 includes an indicator to differentiate between data that will be processed as DTMF tones for transmission on the traffic channel and data that will be processed as a call origination on the traffic channel. The operation of the indicator will be described in greater detail below.

In addition, the wireless communication device includes a mobile identification number (MIN) storage area 130. The MIN is the telephone number of the wireless communication device. During a registration process, the conventional cellular telephone transmits its MIN and an electronic serial number (ESN) to the cell site controller (not shown). The cell site controller may use the MIN and ESN for billing purposes and to authenticate the cellular telephone.

The MIN and ESN are part of a number assignment module (NAM) that are programmed into the NVRAM portion of the memory 104. As is known in the art, the user can operate the keypad 122 to generate an identification command and thereby recall the MIN of the wireless communication device. In an exemplary embodiment of the present invention, the user may operate the keypad 122 in a predetermined manner to recall the MIN of the wireless communication device and to transmit the MIN on the traffic channel as a series of DTMF tones. This aspect of the system 100 will be described in greater detail below.

The various components of the system 100 are coupled together by a bus system 134, which may include a power bus, control bus, and the status signal bus in addition to a data bus. However, for the sake of clarity, the various busses are illustrated in FIG. 1 as the bus system 134.

As those skilled in the art can appreciate, there is no difference in the physical attributes of data stored in the phonebook storage area 126 for processing and transmission as a call origination on the traffic channel and data stored for processing as a series of DTMF tones for transmission on the traffic channel. That is, both types of data are stored as a series of zeroes and ones in conventional memory storage devices. However, the system 100 uses an indicator to demarcate data that will be processed by the CPU 102 as DTMF tones and transmitted by the transmitter 108 over the traffic channel. Numerous different techniques may be used to provide the necessary demarcation.

Figure 2A:
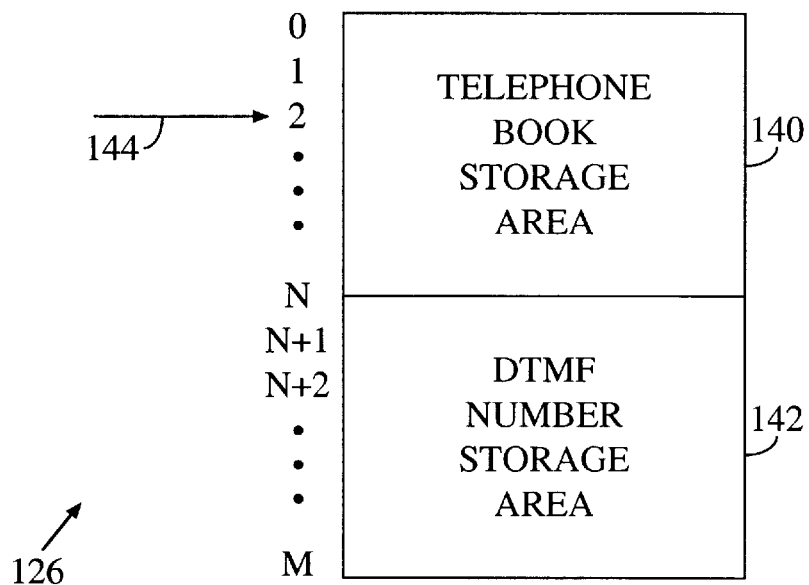
FIG. 2A illustrates a data structure used to store alphanumeric data by the system of FIG. 1.

FIG. 2A illustrates one exemplary embodiment where the phonebook storage area 126 is apportioned into two separate storage areas that may be differentiated on the basis of the address or location within the phonebook storage area. A telephone book storage area 140 contains data that is processed in a conventional (i.e. call origination) manner. That is, telephone numbers or other data within the telephone book storage area 140 are processed and transmitted over the traffic channel in a well known manner. As illustrated in FIG. 2A, the telephone book storage area 140 comprises locations 0 to N while data locations N+1 to M are part of a DTMF telephone book storage are 142. Data entries within the DTMF number storage area 142 are processed in a different manner by the CPU 102. The CPU 102 processes data in the DTMF number storage area 142 as a series of DTMF tones that will be transmitted by the transmitter 108 on the traffic channel. Thus, the system 100 processes data in one part of the phonebook storage area 126 (i.e., the telephone book storage area 140) as conventional call origination data over the traffic channel and processes data in another part of the phonebook storage area (i.e., the DTMF number storage area 142) as DTMF data for transmission over the traffic channel.

A data selector 144 is used to identify a specific location within the phonebook storage are 126. For example, the user may operate buttons on the keypad 122 (see FIG. 1) to show at least a portion of the data contents of the phonebook storage area 126 on the display 120. Selected data from the telephone book storage area 140 are displayed in a conventional fashion. Data entries from the DTMF telephone book storage area 142 may be shown on the display 120 with additional data to indicate that the displayed data entry will be processed as DTMF data. For example, the display can simply include a line adjacent to the displayed numerical data with "DTMF" to indicate that the display data will be processed as a series of DTMF tones and transmitted over the traffic channel. Alternatively, the display can include an icon or other data to indicate that the displayed numerical data will be processed as a plurality of DTMF tones.

Those skilled in the art can appreciate that the data within the DTMF number storage area 142 is not limited to actual telephone numbers. Any data that can be usefully transmitted as a series of DTMF tones may be stored within the DTMF telephone book storage area 142.

For example, the user may enter credit card numbers, calling card numbers, access codes, and the like. During an ongoing communication, the user may readily recall data from the DTMF number storage area 142 and transmit the data over the traffic channel as a series of DTMF tones. For example, the user may wish to call his office and check voicemail. After dialing the office number and establishing a wireless communication link thereto, the user may select a location in the DTMF number storage area 142 containing a voicemail access code and transmit the access code over the message data channel as a series of DTMF tones. Thus, the present invention is not limited to the storage of telephone numbers.

Figure 2B:
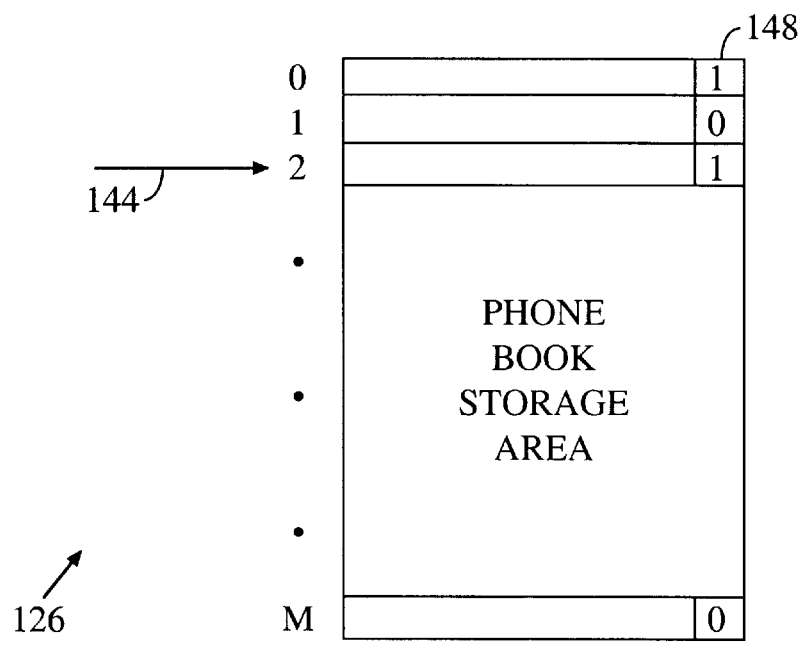
FIG. 2B illustrates an alternative embodiment of a data structure used by the system of FIG. 1 to store alphanumeric data.

In another exemplary embodiment, illustrated in FIG. 2B, the phonebook storage area 126 does not use predetermined data locations for storage of data to be processed as DTMF tones. In this embodiment, a data flag 148 is associated with each location in the phonebook storage area 126. As illustrated in FIG. 2B, the phonebook storage area has data locations 0–M with each location having an associated data flag 148. The data flag indicates whether the data in the associated storage area should be processed as call origination data over the traffic channel or be processed as DTMF tones for transmission over the traffic channel. For example, the data flag 148 associated with location zero in the phonebook storage area 126 is set to a logic value of "1" to indicate that the data in location zero should be processed as DTMF data for transmission over the traffic channel. The data flag 148 associated with storage location one in the phonebook storage area 126 is set to a logic value "0" to indicate that the data should be processed as a call origination for transmission over the traffic channel. Those skilled in the art will recognize that the logic values described above are examples only. The only requirement of this embodiment is that some form of data flag or other indicator be associated with storage locations to indicate whether the data is processed in the conventional fashion or processed as DTMF tones.

Data may be entered into the phonebook storage area 126 in a conventional fashion. Typically the user operates the keypad 122 to enter alphanumeric data such as a name and telephone number. The data is subsequently stored in a user selected location within the phonebook storage area 126. This process is well known and need not be described in greater detail herein. The user can indicate that the entered data should be processed as DTMF tones by storing the entered data in a predetermined data location, such as the DTMF number storage area 142, illustrated in FIG. 2A. The act of entering data into any of the predetermined locations N+1 to M serves as an indication to the system 100 that the data should be processed as a series of DTMF phones and transmitted on the traffic channel.

With the embodiment illustrated in FIG. 2B, the user must enter additional data using the keypad 122 to set the data flag 148 to the desired value thus indicating that the data is stored as conventional data or as data that will be processed as DTMF tones. In either case, the user controls the type of processing that will be performed on the data.

In yet another embodiment of the invention, the system 100 can transmit the stored MIN as a series of DTMF tones over the traffic channel as a callback telephone number. As is well known in the art, a callback telephone number is transmitted over the traffic channel as a series of DTMF tones. The callback number may be automatically stored by the recipient's voicemail messaging service to simplify the process of returning the call. In the conventional wireless communication device, the callback number must be manually entered using the keypad. However, in accordance with an embodiment of the present invention, the user can activate keys on the keypad 122 (see FIG. 1) in a predetermined manner to indicate to the system 100 that the MIN should be extracted from the MIN storage area 130 and transmitted as a series of DTMF tones over the traffic channel.

For example, some wireless communication devices include an information button (not shown) on the keypad 122 that shows the MIN on the display 120. The user may extract the MIN from the MIN storage area 130 using the information button and transmit the MIN as a series of DTMF tones by pressing another button, such as a pound (#) button (not shown) on the keypad 122. Those skilled in the art will recognize that other combinations of buttons may also serve to extract the MIN and transmit it as a series of DTMF tones over the traffic channel. This greatly simplifies the process of sending a callback telephone number by eliminating the need to manually enter the entire callback telephone number using the keypad 122.

Figure 3A:
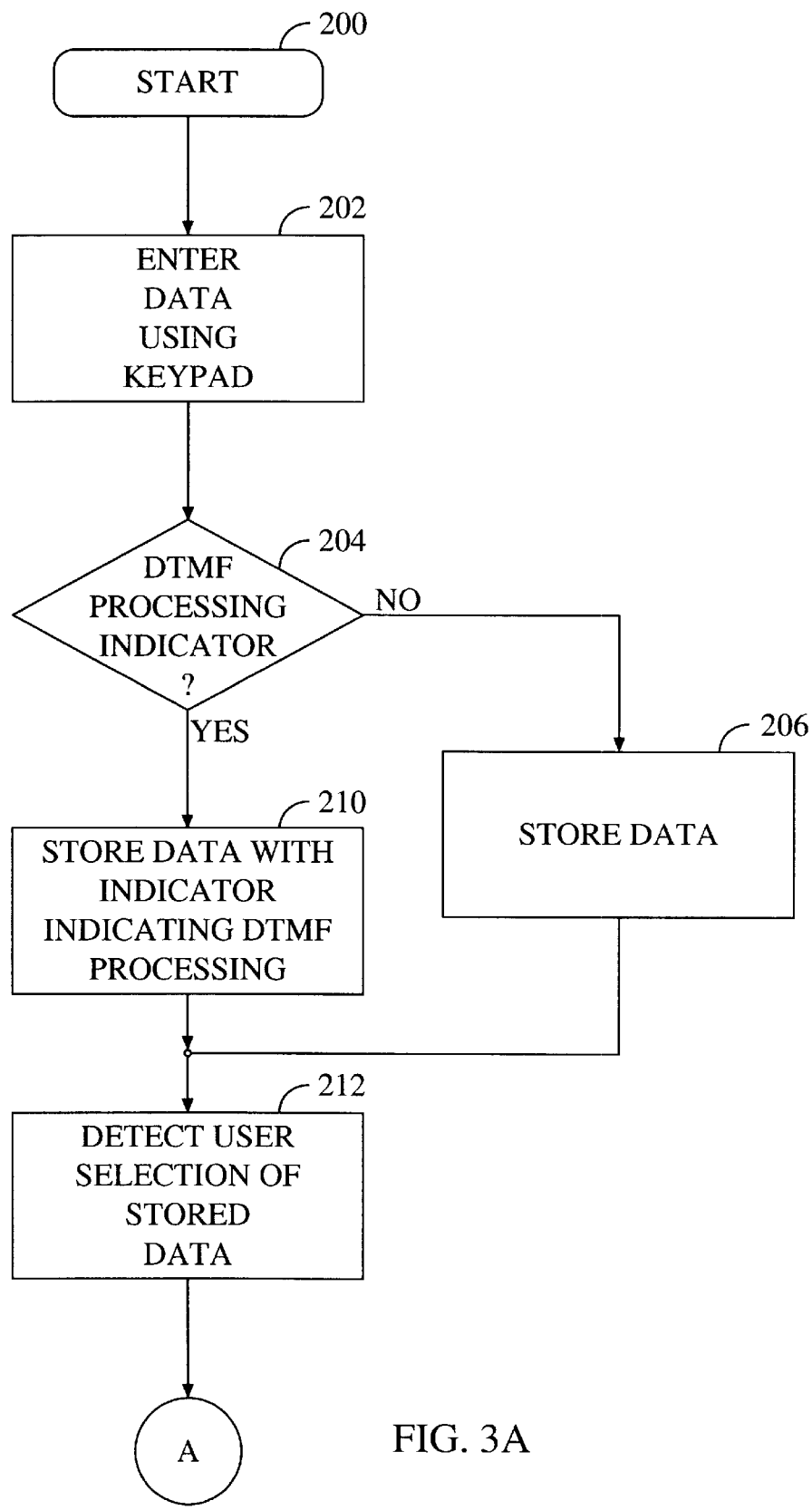
FIG. 3A and FIG. 3B together form a flowchart illustrating the operation of the system of FIG. 1.
Figure 3B:
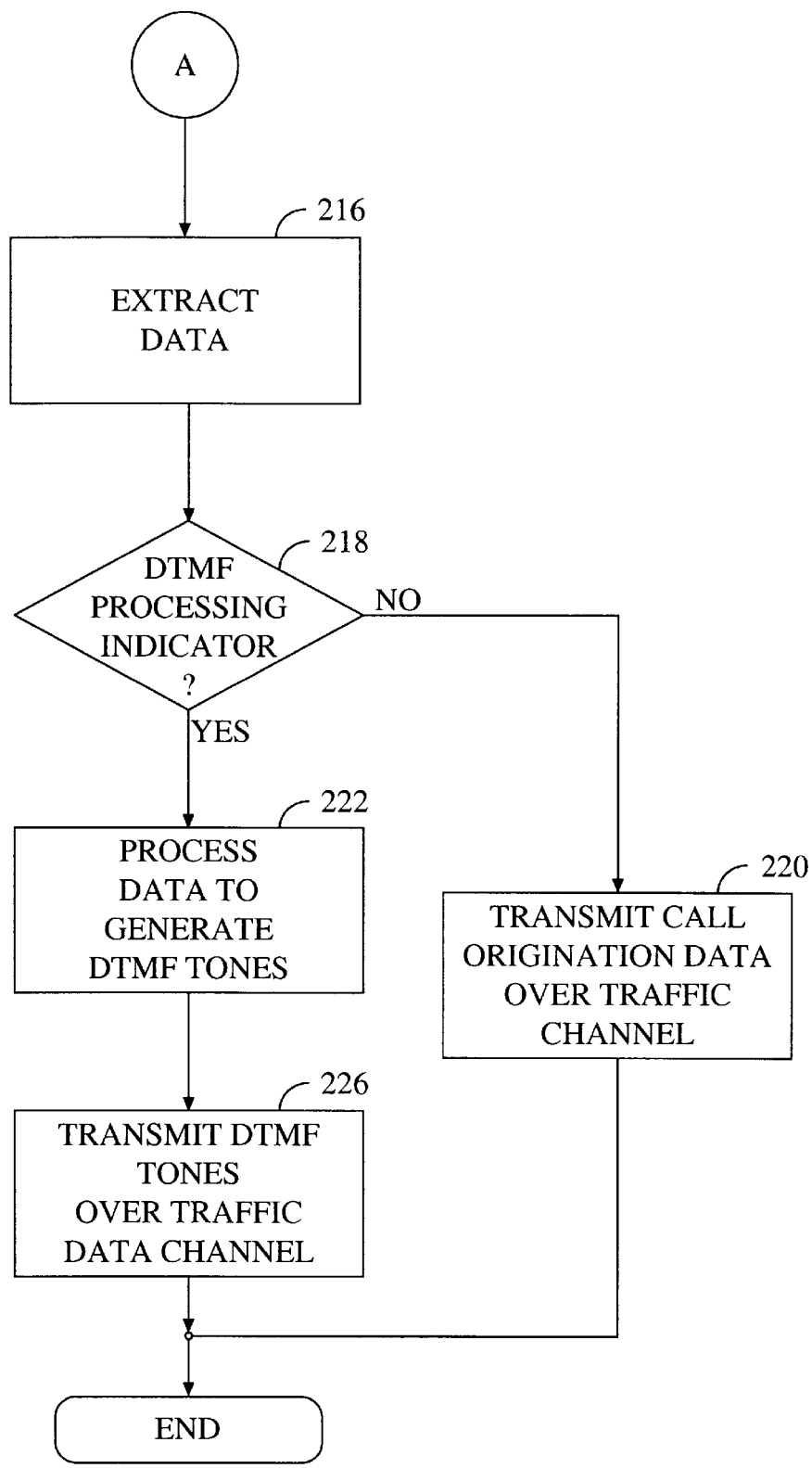

The operation of the system 100 is illustrated in the flowcharts of FIGS. 3A and 3B. At a start 200, illustrated in FIG. 3A, the system 100 is under power and ready for programming. In step 202, the user enters data using the keypad 122 (see FIG. 1) in a conventional manner. The user may enter alphabetic data and numeric data, such as a name and telephone number, using the keypad 122. In decision 204, the system determines whether the user has indicated whether the entered data should be processed as call origination or DTMF tones. As previously discussed, the indicator may be the act of storing the data in a predetermined location, such as the DTMF number storage area 142 (see FIG. 2A) or by setting the data flag 148 (see FIG. 2B). If the user has not entered a DTMF processing indicator, the result of decision 204 is NO. In that event, the system 100 stores the data in a conventional manner in step 206.

If the user indicates DTMF processing, the result of decision 204 is YES. In that event, in step 210, the system 100 stores the data with the indicator indicating DTMF processing. This process may be repeated to program multiple data entries. As discussed above, the user can program destination telephone numbers and names, credit card and calling cards, access codes, and the like.

At a subsequent time, the user may wish to extract data during an ongoing wireless communication. In step 212, the system 100 detects a user's selection of stored data. As previously described, the techniques for displaying and selecting data stored in the phonebook storage area 126 (see FIG. 1) or other storage area are well known in the art.

In step 216, illustrated in FIG. 3B, the system 100 extracts the selected data. In decision 218, the system determines whether the DTMF processing indicator is present. This determination can be made on the basis of the specific location, such as a location in the DTMF number storage area 142 (see FIG. 2A) or on the basis on the data flag 148 (see FIG. 2B). If the DTMF processing indicator is not present, the result of decision 218 is NO. In that event, the system 100 transmits a call origination over the traffic channel in step 220.

If the DTMF processing indicator is present, the result of decision 218 is YES. In that event, in step 222, the system 100 processes the extracted data according to techniques well known in the industry to generate DTMF tones. In step 226, the system 100 transmits the DTMF tones over the traffic channel. As one skilled in the art can appreciate, the entire sequence of digits need not be converted to DTMF tones in step 222 and transmitted in step 226. The system can conveniently process one digit at a time to generate the appropriate DTMF tones in step 222 and transmit the DTMF tones over the traffic channel in step 226. Thus, steps 222 and 226 can be repeated for each individual digit.

Following the transmission of another call origination in step 220 or the transmission of DTMF tones over the traffic channel in step 226, the process ends at 228. The wireless communication link is not terminated by this process. Therefore, the user can repeat steps 212–226 to extract additional data from the phonebook storage area 126 (see FIG. 1) for processing call origination or for processing as DTMF tones for transmission over the traffic channel.

Thus, the system 100 conveniently provides the user with alternative data entry, storage, and processing modes that simplify the operation of the wireless communication device. The additional capabilities provided by the present invention are readily understood by the user of a typical wireless communication device with little or no additional instruction. However, the techniques described herein permit great flexibility in the operation of the wireless communication device and accessory devices, such as voicemail and the like that are accessed via the wireless communication device.

It is to be understood that even though various embodiments and advantages of the present invention have been set forth in the foregoing description, the above description is illustrative only, and changes may be made in detail, yet remain within the broad principles of the invention. For example, FIG. 1 illustrates data stored for processing as a series of DTMF tones as stored in the phonebook storage area 126. However, those skilled in the art will readily recognize that the data stored for processing as a series of DTMF tones may be stored in any convenient location such as the memory 104, or other separate storage device. Therefore, the present invention is to be limited only by the appended claims.

What is claimed is:

1. A wireless communication device, comprising:
   an indicator that the stored data should be processed as dual-tone multi-frequency (DTMF);
   an input device operable by a user to select a portion of the stored data;
   a transmitter coupled to said storage area for transmitting DTMF tones corresponding to said selected portion of stored data over a traffic channel; and
   a data portion associated with the stored data to serve as the indicator that the data stored in the storage area should be processed as DTMF tones.

2. A wireless communication device, comprising:
   an indicator that the stored data should be processed as dual-tone multi-frequency (DTMF);
   an input device operable by a user to select a portion of the stored data;
   a transmitter coupled to said storage area for transmitting DTMF tones corresponding to said selected portion of stored data over a traffic channel; and
   a data portion associated with the stored data to serve as the indicator that the data stored in the storage area should be processed as DTMF data, the input device being operated by the user in a predetermined manner to control the data portion and thereby indicate that the associated data stored in the storage area should be processed as DTMF tones.

3. A method for processing data as dual-tone multi-frequency (DTMF) data in a wireless communication device, comprising:
   storing data;
   indicating that the stored data should be processed as DTMF tones;
   selecting a portion of the stored data; and
   transmitting a plurality of DTMF tones corresponding to said portion of the stored data over the traffic channel;
   wherein indicating that the stored data should be processed as DTMF tones is accomplished by storing data in a predetermined data location designated for storage of data to be processed as DTMF tones.

4. A method for processing data as dual-tone multi-frequency (DTMF) data in a wireless communication device, comprising:
   storing data;
   indicating that the stored data should be processed as DTMF tones;
   selecting a portion of the stored data; and
   transmitting a plurality of GDTMF tones corresponding to said portion of the stored data over the traffic channel;
   wherein indicating that the stored data should be processed as DTMF tones is accomplished by . . . DTMF tones.

* * * * *